United States Patent [19]
Paulus et al.

[11] Patent Number: 5,566,544
[45] Date of Patent: Oct. 22, 1996

[54] ROCKET PREBURNER INJECTOR WITH TAILORED GAS TEMPERATURE PROFILE

[75] Inventors: Donald E. Paulus, Jupiter; George B. Cox, Jr., Tequesta, both, Fla.

[73] Assignee: United Technologies Corporation, Hartford, Conn.

[21] Appl. No.: 250,243

[22] Filed: May 27, 1994

Related U.S. Application Data

[63] Continuation-in-part of Ser. No. 998,981, Dec. 31, 1992, abandoned.

[51] Int. Cl.[6] ........................................... F02K 9/00
[52] U.S. Cl. ............................................. 60/258
[58] Field of Search ....................... 60/258, 39.06, 60/39.02, 39.19, 739, 741, 746

[56] References Cited

U.S. PATENT DOCUMENTS

| | | | |
|---|---|---|---|
| 3,158,998 | 12/1964 | Robinson et al. | 60/741 |
| 3,938,326 | 2/1976 | De Corso et al. | 60/746 |
| 4,499,735 | 2/1985 | Moore et al. | 60/739 |

*Primary Examiner*—Timothy S. Thorpe
*Attorney, Agent, or Firm*—Christopher T. Hayes

[57] ABSTRACT

A method and apparatus for increasing the operating life of a turbopump turbine by reducing the temperature of the combustion products impinging the turbine blades adjacent the roots thereof while increasing the temperature of the combustion products impinging the other portions of the turbine blades to maintain the overall temperature of the combustion products.

1 Claim, 4 Drawing Sheets

ROCKET PREBURNER INJECTOR WITH TAILORED GAS TEMPERATURE PROFILE

CROSS REFERENCE TO RELATED APPLICATION

This is a continuation-in-part of patent application Ser. No. 07/998,981, filed Dec. 31, 1992, in the names of Paulus et al, now abandoned.

TECHNICAL FIELD

This invention relates to a method and apparatus for reducing turbine blade root temperatures in a rocket engine turbopump.

BACKGROUND OF THE INVENTION

The design of rocket engine turbopumps is often limited by the materials used in the turbine section of the turbopump. The turbine blades of rocket engine turbines are subjected to high tensile vibratory and thermal stresses due to the high rotational speed of the turbine and the thermal gradients caused by the operating environment. These stresses are greatest at the root of the turbine blade and decrease at the tip of the blade. The turbine blade design and materials selection must provide adequate strength at the root of the blade to avoid blade failure during operation. The combustion gases entering the turbine are typically at a uniform temperature, and the turbine blades are therefore designed for the same thermal environment from the blade root to the tip. The life of a turbopump turbine is a function of the temperature at which it operates and the speed. One way to increase the operating life of a turbopump turbine is to manufacture the turbine blades from materials which are stronger at turbine operating temperatures than are those materials which are presently used in turbopump turbine blades. Accordingly, as such materials become available, they are typically incorporated into turbopump turbines to provide for longer turbine life or higher operating temperatures. However, materials development is a slow and expensive process. Prior art solutions to materials problems have been focused in two major areas: one is provide elaborate cooling schemes for turbine blades, and the other is to reduce the overall gas temperature entering the turbine from the combustion chamber. The former solution is expensive to apply, and is usually used as a last resort. The latter solution is not really a solution at all since temperatures must increase as engines become larger and efficiency requirements become more demanding.

What is needed is a method of increasing the operating life of a turbopump turbine using currently available materials without the necessity of providing additional cooling air or decreasing overall gas temperature entering the turbine from the combustion chamber.

SUMMARY OF THE INVENTION

It is therefore an object of the present invention is to reduce the deleterious effects of combustion gases on the turbine blades of a turbopump.

Another object of the present invention is to reduce the deleterious effects on the turbine blades without reducing the overall combustion chamber temperatures.

A further object of the present invention is to reduce the deleterious effects on the turbine blade without providing additional cooling air flowing over the turbine blades.

Accordingly, a method and apparatus is disclosed for producing a temperature profile for the combustion gases entering the turbine in which the combustion gases which impinge the root of each turbine blade are cooler than the temperature of the combustion gases which impinge the other portions of the blade.

The foregoing and other features and advantages of the present invention will become more apparent from the following description and accompanying drawings.

BEST MODE FOR CARRYING OUT THE INVENTION

Figure 1:
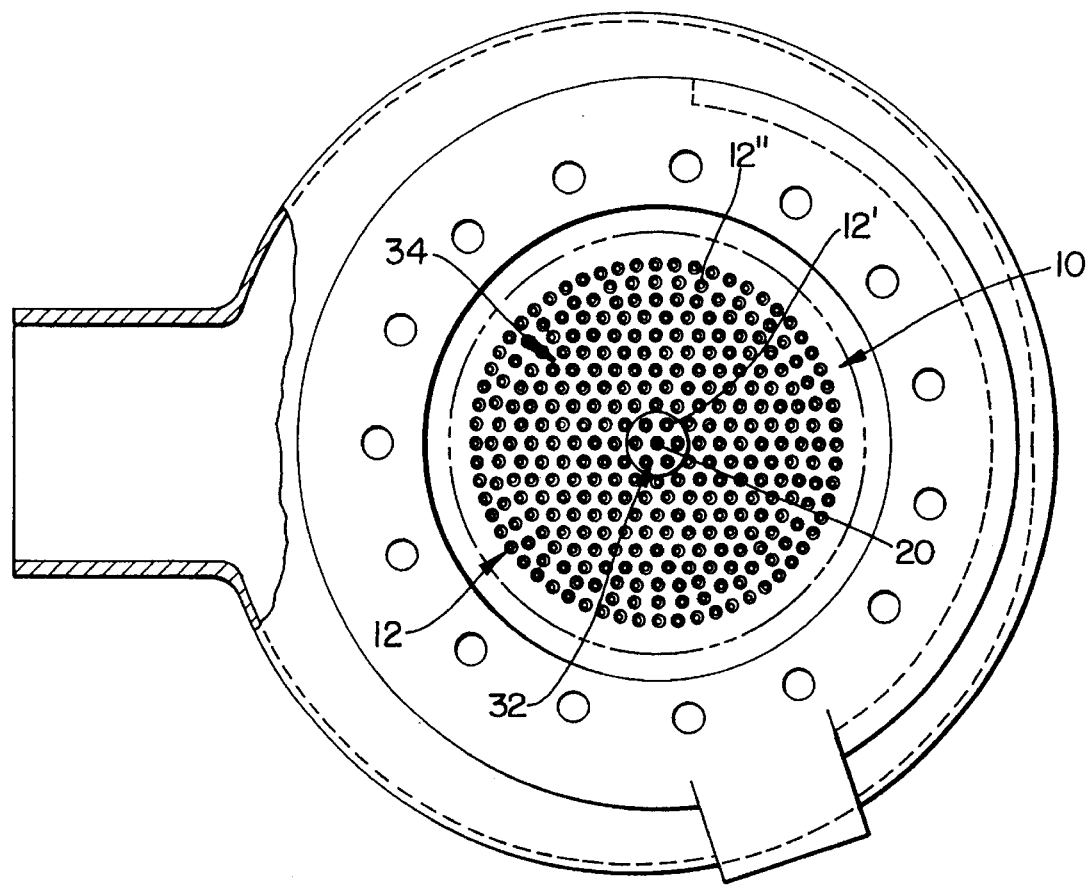
FIG. 1 is a plan view of the faceplate of the present invention taken along line 1—1 of FIG. 2.
Figure 2:
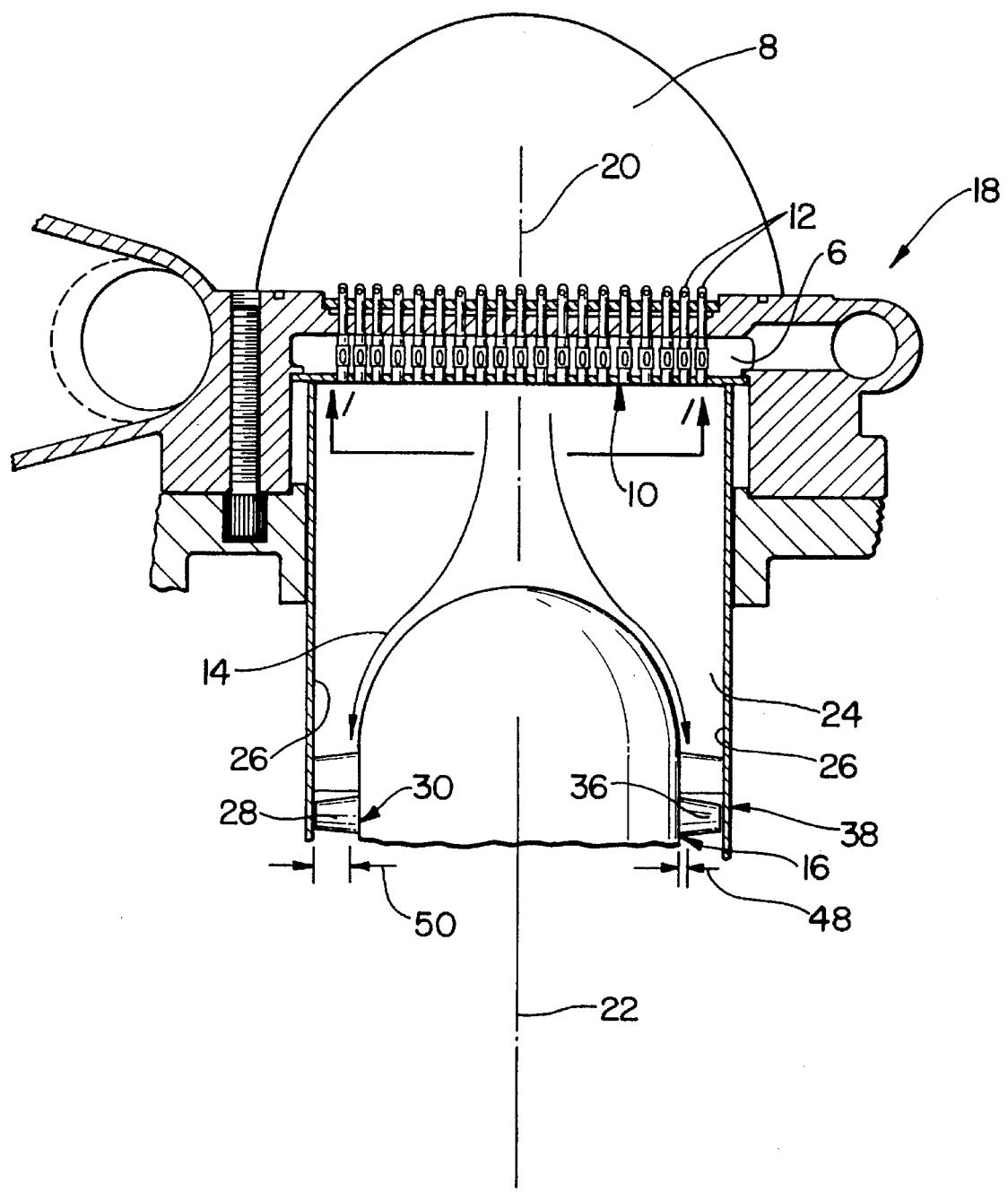
FIG. 2 is a cross-sectional view of a turbopump preburner which incorporates the present invention.

As shown in FIG. 1, the faceplate 10 of rocket preburner injectors known in the art are typically circular, substantially flat, and include a plurality of injector elements 12. The faceplate 10 used in the method of the present invention is of the porous type known in the art in which fuel is flowed through the pores of the faceplate 10 to provide cooling thereof. The injector elements 12 are located in the faceplate 10 and produce the combustion gases 14 used to drive the turbine 16 of a turbopump 18 as shown in FIG. 2. The faceplate 10 is symmetric about a first axis 20 that extends through the circular center of the faceplate 10 and is perpendicular to the faceplate 10.

The turbine 16 is rotatable about an axis of rotation 22 thereof and is located within a passage 24 in which the faceplate 10 is located, such that the passage walls 26 constrain the flow of combustion products 14 flowing from the faceplate 10 and direct the combustion products 14 to the turbine 16. The first axis 20 and the axis of rotation 22 are preferably coaxial so that the radial temperature profile of the combustion products 14 flowing from the faceplate 10 is substantially the same as the temperature profile of the combustion products 14 entering the turbine 16.

Figure 3:
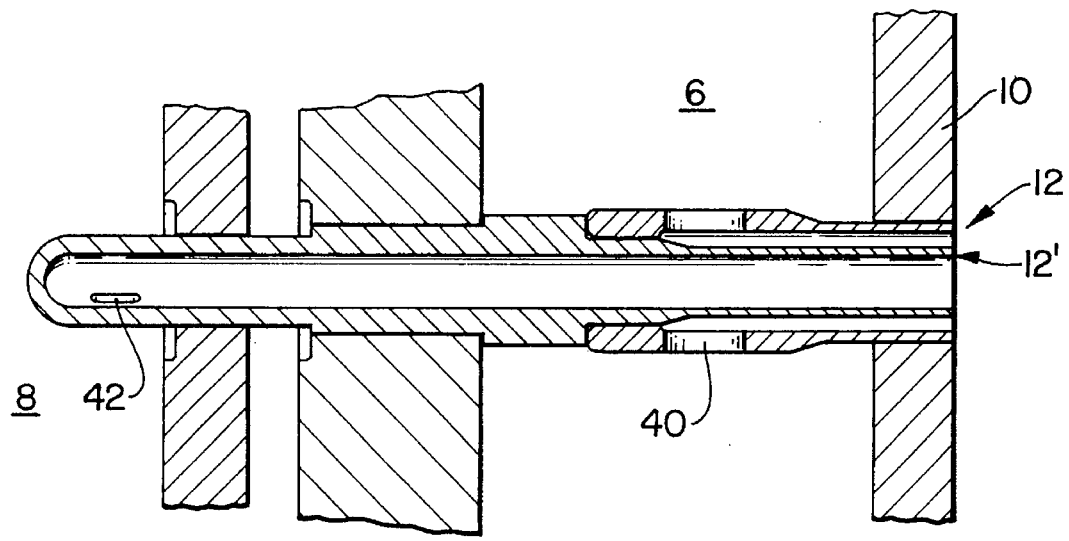
FIG. 3 is a cross-sectional view of one of the injectors of the first section which has a lower oxidizer-to-fuel ratio than the injectors of the second section.
Figure 4:
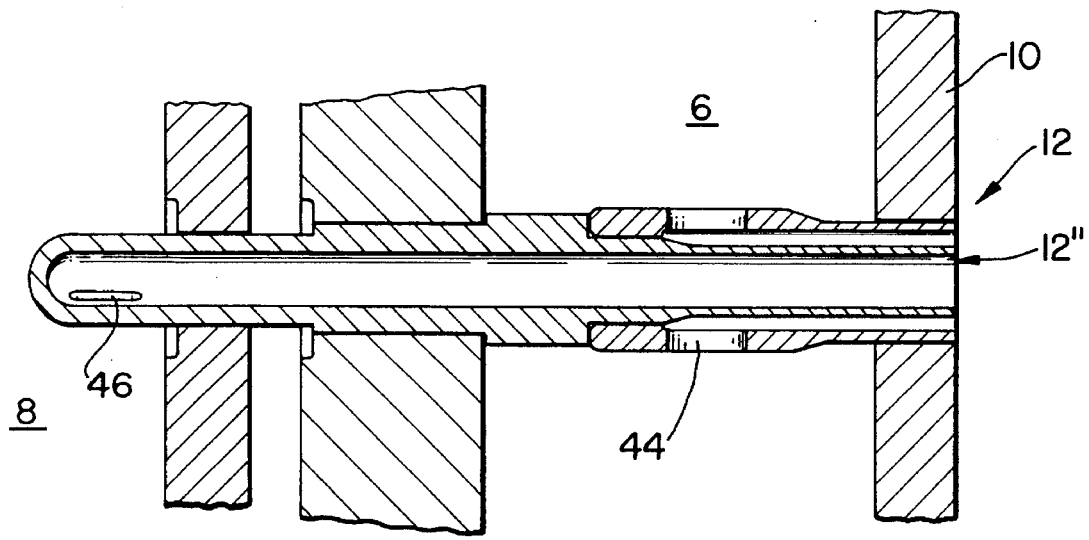
FIG. 4 is a cross-sectional view of one of the injectors of the second section which has a higher oxidizer-to-fuel ratio than the injectors of the first section.

In the method of the present invention, the deleterious effects of the high temperature combustion products on the turbine 16 are reduced by providing fuel and oxygen to the injectors 12 in a manner that produces a lower temperature combustion product 14 impinging the portion of each turbine blade 28 adjacent the root 30 thereof. The fuel is provided to the injectors 12 through a fuel chamber 6, and oxidizer is provided to the injectors 12 through an oxidizer chamber 8, as shown in FIGS. 2–4. The faceplate 10 is divided into two 32, 34 or more annular sections, relative to the first axis 20 thereof. A first amount of oxidizer is flowed to the injectors 12'located in an annular section 32 of the faceplate 10 immediately adjacent the first axis 20. The injectors 12'located in the first section 32 accordingly produce a first oxidizer-to-fuel ratio in the first annular section 32. A second amount of oxidizer is flowed to the injectors 12"located in a second annular section 34 of the faceplate 10, the second section 34 located radially outward from the first section 32 of the faceplate 10 relative to the first axis 20. The second amount establishes a second oxidizer-to-fuel ratio for injectors 12"located in the second section 34.

The method of the present invention is practiced by controlling the oxidizer-to-fuel ratios in such a manner that the temperature of the combustion products entering the turbine 16 adjacent the roots 30 of the blades 28 of the turbine 16 is substantially less than the temperature of the combustion products entering the turbine 16 adjacent the midspan 36 and tip 38 of each turbine blade 28. If the turbopump preburner is of the type in which the overall oxidizer-to-fuel ratio is less than stoichiometric for the particular oxidizer and fuel chosen for the turbopump as is typically the case for porous, fuel cooled faceplates, the oxidizer-to-fuel ratio of the first section 32 is reduced, thereby shifting the oxidizer-to-fuel ratio of the of the first annular section 32 away from the stoichiometric oxidizer to-fuel ratio. As those skilled in the art will readily appreciate, this shifting reduces the temperature of the combustion products 14 produced by the first section 32, and these are the combustion products that impinge the root section 30 of the turbine blades 28.

In addition to reducing the oxidizer-to-fuel ratio of the first section 32, the oxidizer-to-fuel ratio of the second section 34 is maintained at an oxidizer-to-fuel ratio higher than that of the first section 32, and may even be increased somewhat to offset any reduction in the overall temperature of the combustion products that result from the reduction of the oxidizer-to-fuel ratio in the first section 32.

Figure 5:
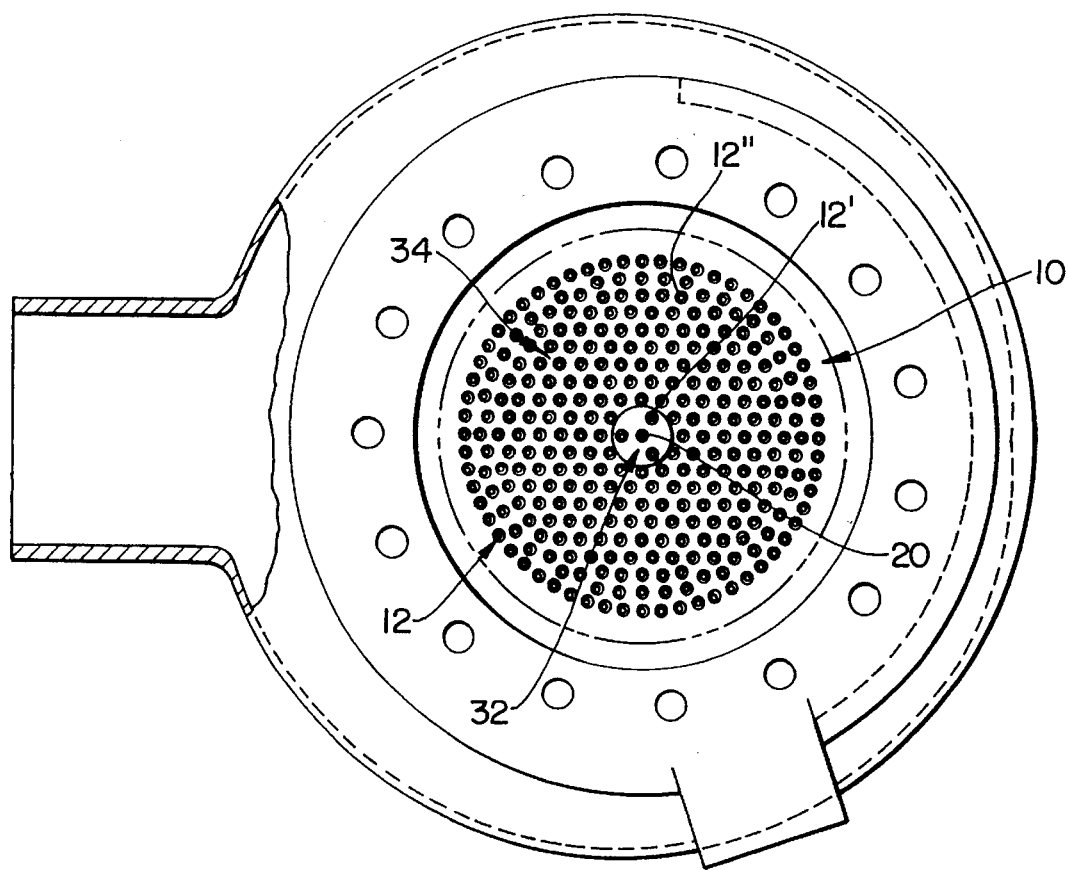
FIG. 5 is a plan view of the faceplate of an alternate apparatus of the present invention in which all of the injectors are identical and the injectors of the first section are spaced less densely than the injectors of the second section.

The preferred apparatus for reducing the oxidizer-to-fuel ratio in the first section 32 is a faceplate 10 using different injector elements 12', 12" in the first section than in the second section as shown in FIGS. 3 and 4. In this method, each of the injector elements 12' in the first section 32 has a first fuel flow orifice 40 having a first minimum fuel flow area and a first oxidizer orifice 42 having a first minimum oxidizer flow area, and each of the injectors 12" in the second section 34 has a second fuel orifice 44 having a second minimum fuel flow area and a second oxidizer orifice 46 having a second minimum oxidizer flow area, and the ratio of the second minimum oxidizer flow area to the second minimum fuel flow area is greater than the ratio of the first minimum oxidizer flow area to the first minimum fuel flow area. As used herein, the phrase "minimum fuel flow area" means, for fuel flowing from the fuel chamber 6 to the passage 24, the minimum flow area encountered by the fuel occurs at the fuel orifice, since it provides the minimum fuel flow area. Likewise, the phrase "minimum oxidizer flow area" means, for oxidizer flowing from the oxidizer chamber 8 to the passage 24, the minimum flow area encountered by the oxidizer occurs at the oxidizer orifice, since it provides the minimum oxidizer flow area. Alternately, a faceplate 10 having identical injector elements 12 in the first and second sections 32, 34, may be used by spacing the injector elements 12" of the second section 34 more densely on the faceplate 10 than the injector elements 12' of the first section 32, as shown in FIG. 5.

As those skilled in the art will readily appreciate, either of these methods will result in the temperature of the combustion products 14 produced by the injector elements 12' of the first section 32 being less than the temperature produced by the injector elements 12" of the second section 34. As a result, the combustion products of the injector elements 12' in the first section 32 impinge a first portion 48 of each of the turbine blades 28 of the turbine 16, and combustion products of the injector elements 12" in the second section 34 impinge a second portion 50 of each of the turbine blades 28 of the turbine 16, and the second portion 50 of each blade 28 is radially outward from the first portion 48 which is adjacent the root 28 thereof.

For those applications where the injector is of the type in which the overall oxidizer-to-fuel ratio is greater than stoichiometric for the particular oxidizer and fuel chosen for the rocket, the oxidizer-to-fuel ratio of the first section 32 is increased, thereby shifting the oxidizer-to-fuel ratio of the of the first annular section 32 away from the stoichiometric oxidizer-to-fuel ratio. As those skilled in the art will readily appreciate, this shifting reduces the temperature of the combustion products produced by the first section 32. The oxidizer-to-fuel ratio of the second section 34 is maintained greater than the oxidizer-to-fuel ratio of the first section 32, and may even be decreased somewhat to offset any reduction in the overall temperature of the combustion products that result from the reduction of the oxidizer-to-fuel ratio in the first section 32.

An apparatus for increasing the oxidizer-to-fuel ratio in the first section 32 is a faceplate 10 using identical injector elements in the first and second sections 32, 34, and spacing the injector elements of the second section 34 more densely on the faceplate 10 than the injector elements of the first section 32. Alternately, a faceplate 10 having different injector elements in the first and second sections 32, 34, may be used in which each of the injector elements in the first section 32 has a first minimum fuel flow area and a first minimum oxidizer flow area, and each of the injectors in the second section 34 has a second minimum fuel flow area and a second minimum oxidizer flow area, and the ratio of the second minimum oxidizer flow area to the second minimum fuel flow area is less than the ratio of the first minimum oxidizer flow area to the first minimum fuel flow area.

The method and apparatus of the present invention increases the operating life of a turbopump turbine using currently available materials without the necessity of decreasing overall gas temperature entering the turbine from the combustion chamber. The method of the present invention employs oxidizer and fuel injectors which use the fixed, relative areas of the oxidizer orifices and fuel orifices to regulate the combustion temperature, and to group oxidizer and fuel injectors having like combinations of flow areas to provide a distribution of combustion temperature over specified regions of the combustion flowfield. This represents a significant simplification, relative to the prior art, in weight, cost, and reliability. The deleterious effects of combustion gases on the turbine blades are thus reduced without providing additional cooling air and without adding additional valves and their attendant weight, cost, and reliability disadvantages. Hence, the method of the present invention represents a substantial improvement in life cycle for the art of rocket engines.

Although this invention has been shown and described with respect to a detailed embodiment thereof, it will be understood by those skilled in the art that various changes in form and detail thereof may be made without departing from the spirit and scope of the claimed invention.

We claim:

1. In a rocket engine having a preburner injector with a faceplate which includes a plurality of injector elements located therein that produce combustion gases used to drive a turbine of a turbopump, the faceplate is symmetric about a first axis extending therethrough that is perpendicular to the faceplate, and the turbine is rotatable about an axis of rotation and located within a passage in which the faceplate is located, the improvement comprising providing first injector elements located in a first annular section of the faceplate, and providing second injector elements located in a second annular section of the faceplate, the second section is radially outward from the first section relative to the first axis, each of the injector elements in the first section has a first fuel orifice for admitting fuel into the first injector and a first oxidizer orifice for admitting oxidizer into the first injector, each of said first fuel orifices has a first minimum fuel flow area and each of said first oxidizer orifices has a first oxidizer flow area, and each of the injector elements in the second section has a second fuel orifice for admitting fuel into the second injector and a second oxidizer orifice for admitting oxidizer into the second injector, each of said second fuel orifices has a second minimum fuel flow area and each of said second oxidizer orifices having a second minimum oxidizer flow area, and the ratio of the second oxidizer flow area to the second fuel flow area of each injector in the second section is greater than the ratio of the first oxidizer flow area to the first fuel flow area of each injector in the first section.

* * * * *

UNITED STATES PATENT AND TRADEMARK OFFICE
CERTIFICATE OF CORRECTION

PATENT NO. : 5,566,544
DATED : October 22, 1996
INVENTOR(S) : Donald E. Paulus, George B. Cox, Jr.

It is certified that error appears in the above-indentified patent and that said Letters Patent is hereby corrected as shown below:

In column 1 at line 67, change "cooling air flowing" to --coolant flow--.
In line 19 of claim 1, change "first oxidizer" to --first minimum oxidizer--.
In line 25 of claim 1, change "having" to --has--.

Signed and Sealed this

Seventeenth Day of June, 1997

*Attest:*

BRUCE LEHMAN

*Attesting Officer*  Commissioner of Patents and Trademarks